Feb. 3, 1931. K. G. KUTCHKA 1,790,820
GLASS TANK CONSTRUCTION
Filed April 17, 1928 2 Sheets-Sheet 1

INVENTOR.
Karl G. Kutchka
by
James C. Bradley
Atty

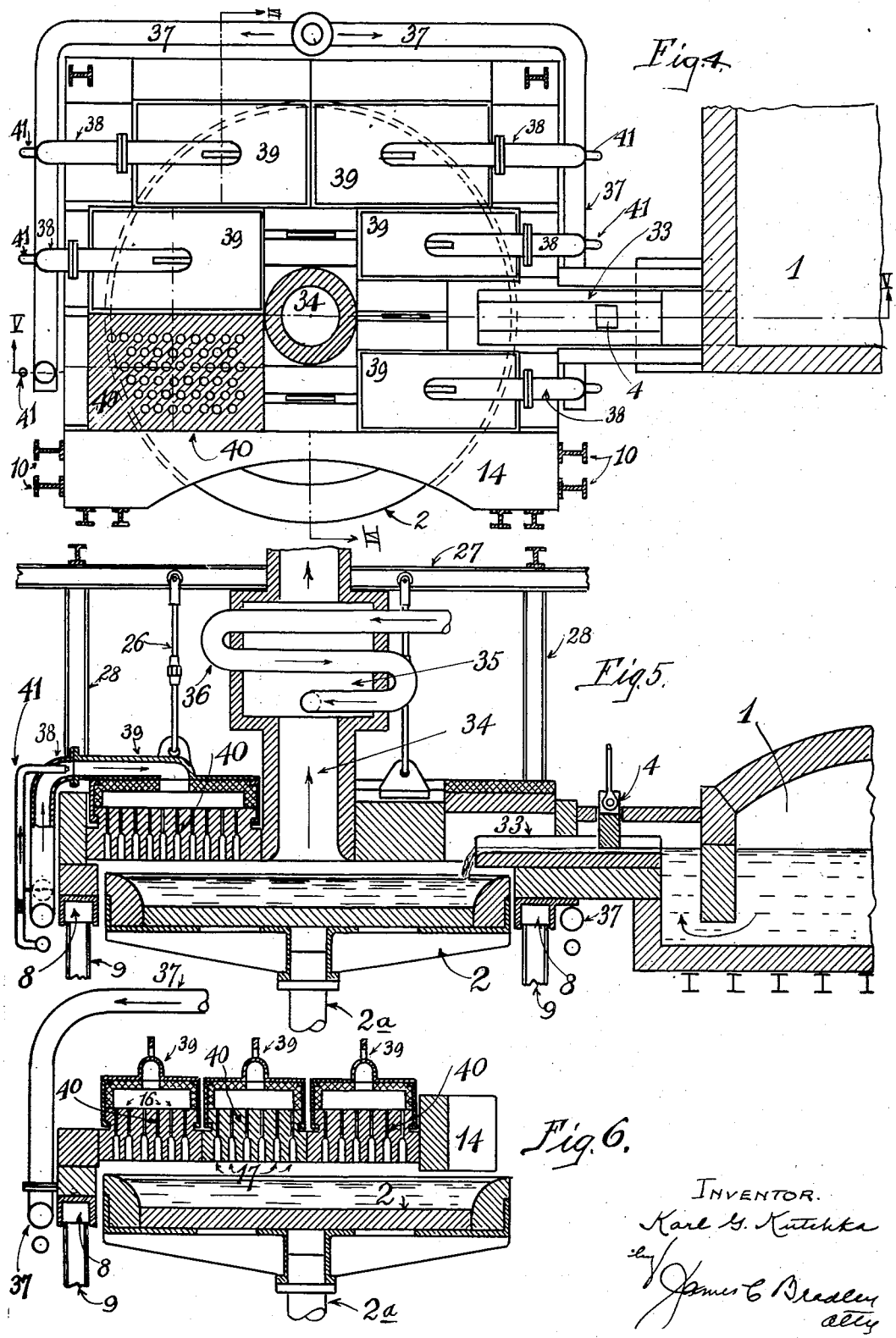

Patented Feb. 3, 1931

1,790,820

UNITED STATES PATENT OFFICE

KARL G. KUTCHKA, OF WILKINSBURG, PENNSYLVANIA

GLASS-TANK CONSTRUCTION

Application filed April 17, 1928. Serial No. 270,653.

Figure 1:
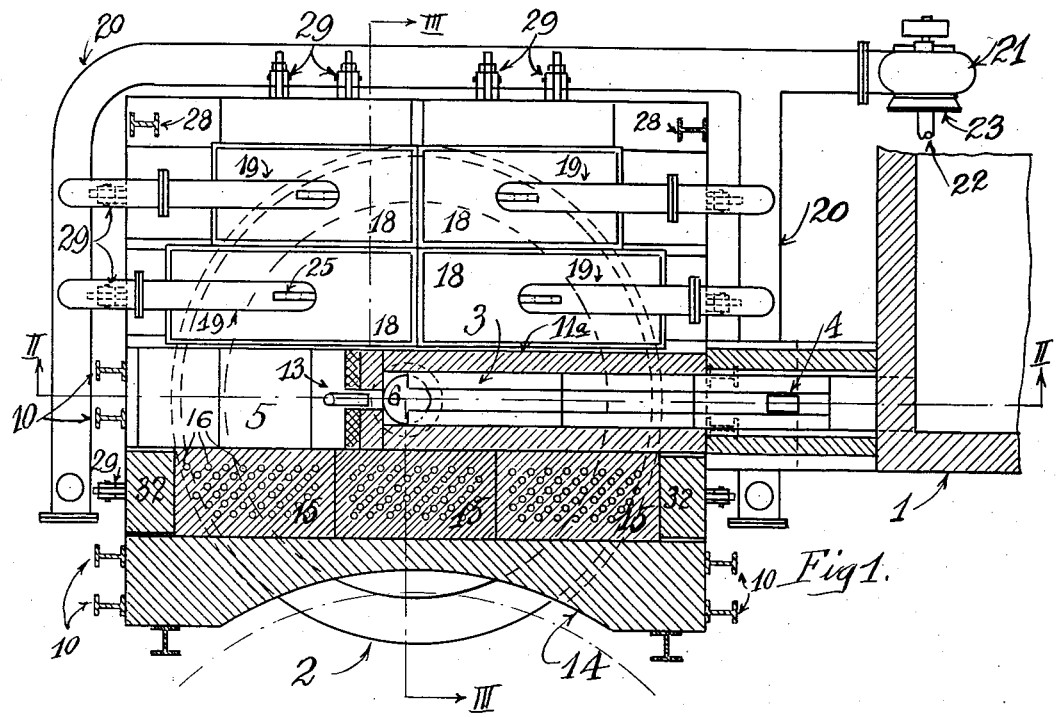
Figure 2:
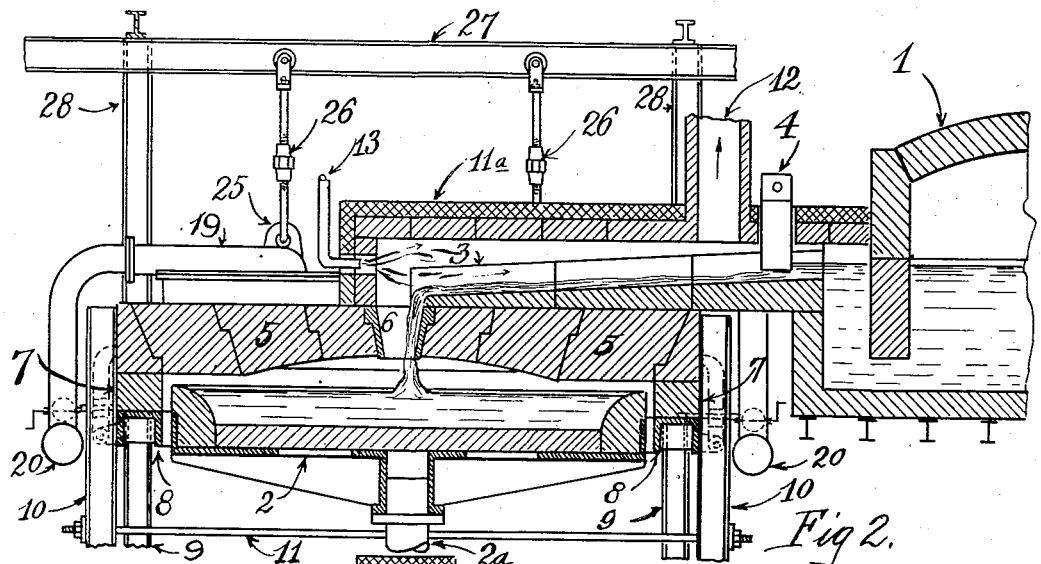
Figure 3:
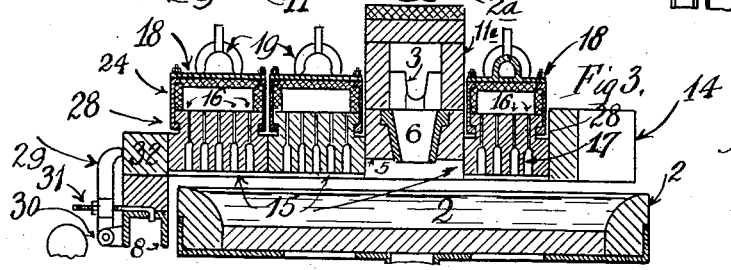

The invention relates to a glass tank construction of the rotary type for use with suction feeders in the manufacture of glass containers and the like. The invention has to do primarily with the means for supplying the glass to the tank and the means for heating the tank. It has for its principal objects the provision of a construction of the type specified, wherein the economy in gas consumption as compared with the furnaces constructed in accordance with existing practice is substantially increased, and wherein the glass supplied to the blank molds at the periphery of the tank is improved in quality with less bubbles and other imperfections in the resultant product. Certain embodiments of the invention are illustrated in the accompanying drawings, wherein:

Figure 1 is a partial plan view and partial section with certain parts removed to more clearly show the construction. Fig. 2 is a section on the line II—II of Fig. 1. Fig. 3 is a section on the line III—III of Fig. 1. Fig. 4 is a partial plan view and partial section of a modification with certain of the parts removed to more clearly disclose the construction. Fig. 5 is a section on the line V—V of Fig. 4. And Fig. 6 is a section on the line VI—VI of Fig. 4.

Referring first to the construction of Figs. 1, 2 and 3, 1 is a melting tank, preferably of the regenerative or recuperative type, and 2 is a rotating tank or pot mounted upon an axle 2a and continuously receiving a supply of glass through the conduit 3 from the tank 1, the flow through this trough or conduit being regulated by means of the gate 4. The trough 3 extends over the top of the arch 5 which, as indicated in Fig. 2, is relatively low so that its lower side approaches relatively close to the glass in the pot, and is provided at its center 6 with the opening through which the flow of glass from the tank to the pot passes. The arch 5 is supported by the blocks 7, which in turn rest upon the frame 8 supported by I-beams 9. Lateral support is provided by means of the buck stays 10 secured together by the tie rods 11. The conduit 3 is surrounded by suitable walls 11a of refractory material which with the vertical outlet member 12 constitutes a flue through which the gases of combustion from the space above the pot 2 are conducted away, such escaping gases of combustion assisting in keeping the stream of glass in the trough hot. Additional gas for this purpose may be also supplied through the pipe 13.

At one side of the furnace is the usual vertical arch 14 lying partly above the pot 2 and partly inward from the periphery of such pot, as indicated in Fig. 1, so that the surface of the glass is exposed at this point, this being the area from which the glass is withdrawn by means of the usual blank molds supported upon a rotary carrier in accordance with the well-known practice of the art.

The portion of the top of the pot or tank 2 not covered by the arch 5 is covered by the seven plates or blocks 15, 15, 15, etc., three of which have their metal hoods or covers removed in the showing of Fig. 1. These blocks are of refractory material and have a cross section as indicated in Fig. 3, a plurality of small vertical passages 16 extending downward through the blocks and terminating in the enlargements 17. These blocks constitute burners and a mixture of gas and air is supplied thereto by means of the covers 18 connected to the inlet pipes 19, 19, etc. These inlet pipes are supplied from the main 20 (Fig. 1) leading to the fan 21. This fan is supplied with gas through the central pipe 22 around which is an annular opening 23 through which air is drawn to give a suitable combustible mixture. The blocks 15, 15 as thus supplied with a combustible mixture, provide surface combustion at their lower faces and in relatively close proximity to the surface of the glass in the tank. In operation, the combustible mixture of gas and air is supplied through the passages 16 under relatively high pressure and combustion occurs in the recesses 17 and over the lower faces of the blocks. The flow of gas and air under relatively high pressure through the small passages 16 serves to secure an intimate mixture of the gas and air, and this mixture in burning permeates the surface of the clay surrounding the recesses 17 and also the surface constituting the lower face of the block, so that an intense surface combustion occurs bringing the lower side of the block and the interiors of the recesses to an incandescent heat. Under these conditions of surface combustion, a much higher temperature is secured than would otherwise be possible with ordinary Bunsen burners and the economy of fuel is very substantially increased. In the construction of Figs. 1, 2 and 3, seven of the blocks 15, 15, 15 are shown, but it will be understood that the number of these blocks which are required to keep the glass at a proper temperature will vary and that the invention is not limited to the number or arrangement of blocks shown, as different arrangements and numbers of blocks may be employed.

The covers 18 of the blocks are preferably in the form of castings, and are employed to support the blocks above. These covers have their side walls 24 formed with inwardly projecting flanges 28 which engage grooves in the sides of the blocks. The covers are also provided with perforated lugs 25 engaged by the turn buckles 26, and such turn buckles are in turn supported by the beams 27 carried by the I-beams 28. This method of support provides for the vertical adjustment of the blocks 15, 15, 15, etc. so that the heat applied to the glass may be regulated in this manner, the blocks being lowered when more heat is required. The supply pipes 19 together with the main 20 and the fan 21 are movable vertically with the refractory members 15 to permit the adjustment specified, the gas pipe 22 being supplied through a suitable flexible connection, not shown. The blocks 15, 15, 15, etc. are clamped tightly together laterally by means of levers 29 pivoted at 30 to the frame 8 and forced in by means of the nuts on the threaded rods 31 which are hooked into the frame 8, as indicated in Fig. 3. The upper ends of these levers press against blocks 32 which in turn press against the sides of the outer blocks 15, the location of the levers being indicated in Fig. 1. By this arrangement, a roof or cover with tight joints is secured and the cover plates 18 are protected from any undue heat which might otherwise be applied if the blocks were not brought in close contact.

The construction of Figs. 4, 5 and 6 differs from that of Figs. 1, 2 and 3, in that the glass from the melting tank 1 is introduced at the side of the pot 2 through the trough 33 instead of being introduced at the center of the pot. The gases of combustion are conducted upward from the space above the pot by means of the vertical flue 34 which has in it an enlargement 35. In this enlargement are located the coils 36 constituting a part of the air supply main 37, such main having the branch pipes 38, 38, etc. leading into the hoods or covers 39, 39, etc. of the burner blocks 40, 40, etc. In this manner, the heat of the escaping gases is utilized in heating the air used in the burners. Gas is supplied to each of the branch pipes 38, 38, etc. in this construction by means of the pipes 41, 41, etc. The construction of the hoods or covers 39 for the blocks 40, as well as the construction of the blocks themselves, is precisely the same as explained in connection with the construction of Figs. 1, 3, the only difference being in the somewhat different size and shape of these parts incident to the supply of glass to the side of the tank instead of to the center and incident to the elimination of the arch 5 of the Figs. 1 to 3 construction. The parts which are the same as in the Figs. 1 to 3 construction are similarly numbered and the construction will be readily understood without further explanation.

What I claim is:

1. In combination with a container for molten glass, a permanent cover or roof for the container in opposition to the surface of the glass and closely adjacent thereto and including a refractory member formed on its lower face so as to promote surface combustion, means for supplying gas and air through the body of said member to the lower face thereof, and means for supporting said member from above for vertical movement in order to maintain the flame of combustion close to the surface of the glass, but in spaced relation with respect thereto.

2. In combination with a rotary tank or pot and means for supplying molten glass continuously thereto, a cover or roof for the tank in opposition to the surface of the glass and closely adjacent thereto with a central outlet therethrough for the escape of gases of combustion, said cover or roof including a plurality of refractory blocks surrounding said outlet and each formed on its lower face so as to promote surface combustion, and means for supplying gas and air through the bodies of said blocks to the lower faces thereof.

3. In combination with a rotary tank or pot, a cover or roof for the tank in opposition to the surface of the glass and closely adjacent thereto, with a central opening therethrough for the escape of gases of combustion, said cover or roof including a plurality of refractory blocks surrounding said outlet and each formed on its lower face so as to promote surface combustion, means for supplying a flow of glass continuously over said cover or roof and through said central opening, and means for supplying gas and air through the bodies of said blocks to the lower faces thereof.

4. In combination with a rotary tank or pot, a cover or roof for the tank in opposition to the surface of the glass and closely adjacent thereto, and including a narrow arch extending the width of the tank and provided with a central opening therethrough for the escape of gases of combustion, said cover or roof also including a plurality of refractory blocks on both sides of said arch and each formed on its lower face so as to promote surface combustion, means for supplying a flow of glass continuously over said arch and through said central opening, and means for supplying gas and air through the bodies of the blocks to the lower faces thereof.

5. In combination with a container for molten glass, a cover or roof for the tank in opposition to the surface of the glass and closely adjacent thereto and including a plurality of refractory blocks placed side by side and each suspended from above, said blocks being formed on their lower faces so as to promote surface combustion, means for supplying gas and air through the bodies of the blocks to the lower faces thereof, and means for applying force laterally to the blocks to clamp them tightly together.

6. In combination with a rotary tank or pot, a cover or roof for the tank in opposition to the surface of the glass and closely adjacent thereto, and including a narrow arch extending the width of the tank and provided with a central opening therethrough for the escape of gases of combustion, said cover or roof also including a plurality of refractory blocks on both sides of said arch and each formed on its lower face so as to promote surface combustion, means for supplying a flow of glass continuously over said arch and through said central opening, means for suspending the blocks from above independent of the arch, means for applying lateral pressure to the blocks to clamp them together, and means for supplying gas and air through the bodies of the blocks to the lower faces thereof.

In testimony whereof, I have hereunto subscribed my name this 14 day of April, 1928.

KARL G. KUTCHKA.